June 3, 1969 G. HÖHNE 3,447,522
IGNITION ARRANGEMENT FOR INTERNAL COMBUSTION ENGINES
Filed July 17, 1967 Sheet 1 of 2

INVENTOR
Gerd Höhne by Michael J. Striker
Atty

United States Patent Office 3,447,522
Patented June 3, 1969

3,447,522
IGNITION ARRANGEMENT FOR INTERNAL
COMBUSTION ENGINES
Gerd Höhne, Ludwigsburg, Germany, assignor to Robert
Bosch, GmbH, Stuttgart, Germany
Filed July 17, 1967, Ser. No. 653,848
Claims priority, application Germany, July 20, 1966,
B 88,075
Int. Cl. F02p 1/00; H05b 41/36
U.S. Cl. 123—149                                        10 Claims

ABSTRACT OF THE DISCLOSURE

An ignition arrangement for internal combustion engines in which the timing of the ignition pulse is varied as a function of speed of the crankshaft. A magnetic circuit path is established between a rotary member and two separate stationary pole piece members. One of the stationary pole piece members is also magnetically linked with the core of an induction coil. The magnetic path of the other stationary pole piece member bypasses the core of the induction coil. The pole piece member magnetically linked with the induction coil is further shaped so that when the rotary member passes by, a magnetic flux pattern is generated whereby a voltage pulse is induced in the induction coil and the ignition level of the pulse is attained at the desired instant of time.

Background of the invention

In order to conform to the combustion process requirements within the cylinders of internal combustion engines, the commonly known ignition arrangements use a magnetic control generator coupled to the crankshaft of the engine by means of a centrifugal force positioning member. Such an arrangement is described, for example, in the German Patent 1,193,309. As a result, the ignition instant is advanced with an increase in the speed of the chankshaft. It is the principal object of the present invention to provide an ignition arrangement which is simplified over the prior art, and which is designed so that a control generator accomplishes the advance in the ignition timing through electromagnetic means without the use of a centrifugal force positioning member.

The object of the invention is achieved through the use of a pole piece having two magnetically separated members. These members have a varying surface along their longitudinal axes, and are constructed so that one is magnetically coupled with the core of the induction coil, whereas the other member diverts the magnetic flux so that it bypasses the induction coil. In particular, the present invention provides that the ignition $\varphi = \varphi(n)$ is varied through the design of the member coupled magnetically with the induction coil whereby the longitudinal dimension $x$ of this member varies with the angle $\alpha$ of rotation of a movable member rotating about the stationary members so that $$\frac{dx}{d\alpha} = -\frac{1}{n_{(\varphi)}} \cdot C$$

wherein $n_{(\varphi)}$ is the inverse function of the ignition timing function $\varphi(n)$ and C is a constant.

Summary of the invention

An ignition arrangement for internal combustion engines having among its operating parts, an induction coil and a magnetizable core therethrough. A first stationary pole piece member is magnetically linked with the core, whereas a second stationary pole piece member is magnetically isolated from the induction coil as well as from the first pole piece member. A movable member made of magnetic material rotates about the stationary members and forms a magnetic path with them. The first stationary pole piece member is designed so that the magnetic flux pattern generated as a result of the movable member in relation to the stationary members, varies in a predetermined manner. The variation of the magnetic flux pattern is such that a voltage signal is induced in the induction coil and attains the ignition level at the proper instant of time, depending upon the speed of the engine crankshaft.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Description of the preferred embodiments

Figure 1:
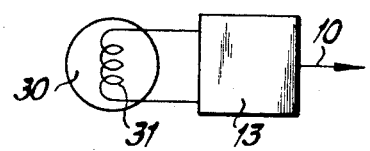
FIG. 1 is a functional schematic diagram of the ignition arrangement in accordance with the present invention.
Figure 2:
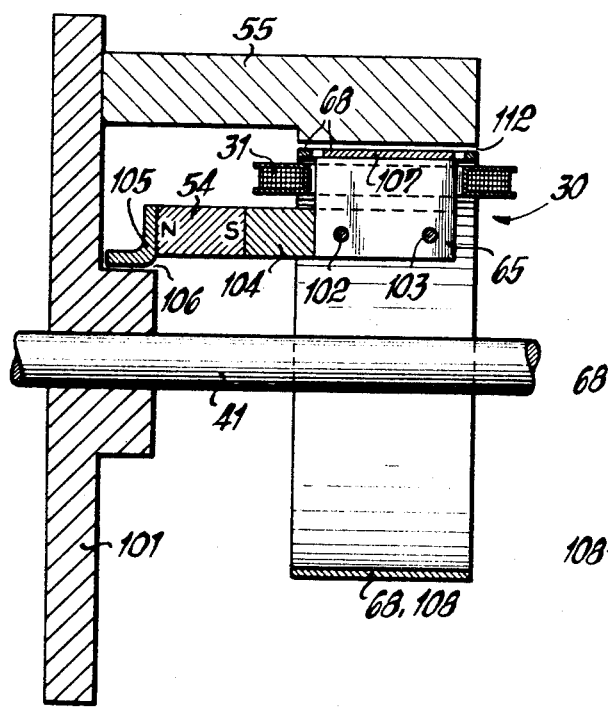
FIG. 2 is a cross-sectional elevational view of the control generator whereby an ignition pulse is generated at the desired instant of time and as a function of the engine crank speed.
Figure 3:
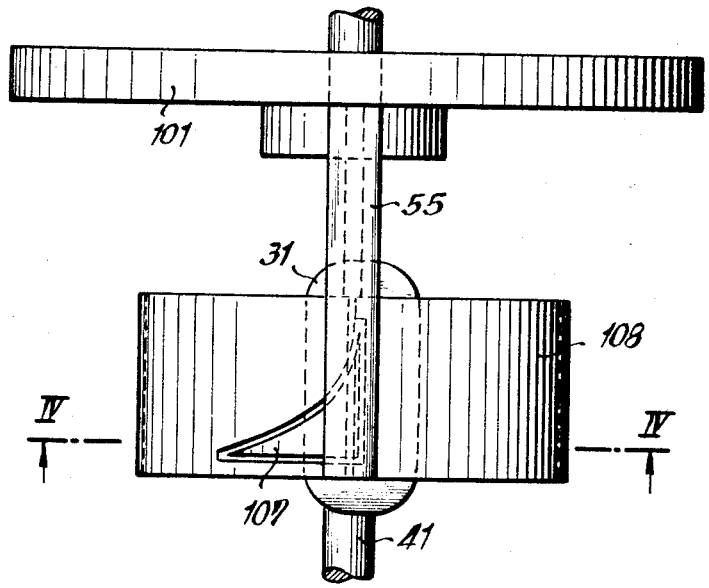
FIG. 3 is a plan view of the generator arrangement of FIG. 2.

As shown in FIG 1, the ignition arrangement, in accordance with the present invention, includes a magnetic control generator 30 having an induction coil 31. The induction coil 31 provides a control signal to an electronic switching arrangement 13. The electronic switching arrangement 13, shown in block form only, has a switching stage connected to the induction coil 31. The output of the switching stage is connected to a power amplifying stage. The output of the electronic switching arrangement 13 designated by the reference numeral is led to the primary winding of an ignition coil (not shown). The ignition pulse generator in the secondary of the ignition coil is transmitted, in the commonly known manner to the spark plugs by the distributor. The magnetic control generator 30 shown in detail in FIGS 2, 3 and 4. is adapted to a two cylinder four-cycle engine, and is driven by the crank shaft of the engine through the driving shaft 41. A disk 101 made of soft iron is mounted upon the driving shaft 41. A magnetically conducting member 55 is secured to the disk 101. The member 55 is situated radially so that when rotating, its frontal surface 58 moves across the stationary part of the generator. The member 55 is proportioned so that its frontal edges $a$ is relatively small compared to its longitudinal length.

The stationary portion of the generator includes a soft iron core 65 within the induction coil 31. The soft iron core 65 is secured to another soft iron member 104 by means of the screws 102 and 103. The member 104 is secured to the permanent magnet 54. The permanent magnet is shaped in the from of a bar magnet which is polarized so that the south pole faces the member 104. The north pole of the permanent magnet 54 is secured to a further soft iron member 105 which is magnetically linked to the disk 101 through an air space 106.

Figure 5:
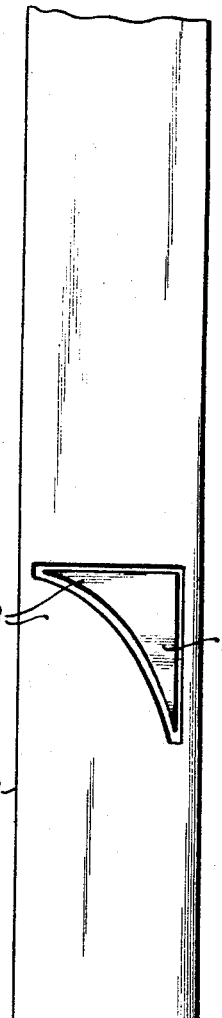
FIG. 5 is a development of the cylindrical surface of the stationary pole pieces shown in FIGS. 2 to 4.

As part of the stationary portion of the generator, is a pole piece 68 arranged coaxially to the driving shaft 41. As evident from FIG. 5, the pole piece 68 consists of two separate magnetic members 107 and 108. The part 107 has a varying axial length $x$ in its rotational direction with respect to the member 55. The part 108 has an axial length $l-x$, neglecting the air space between the two parts for the purpose of magnetic isolation. The air space between the two parts 107 and 108 can also be filled with a non-magnetic material.

Figure 4:
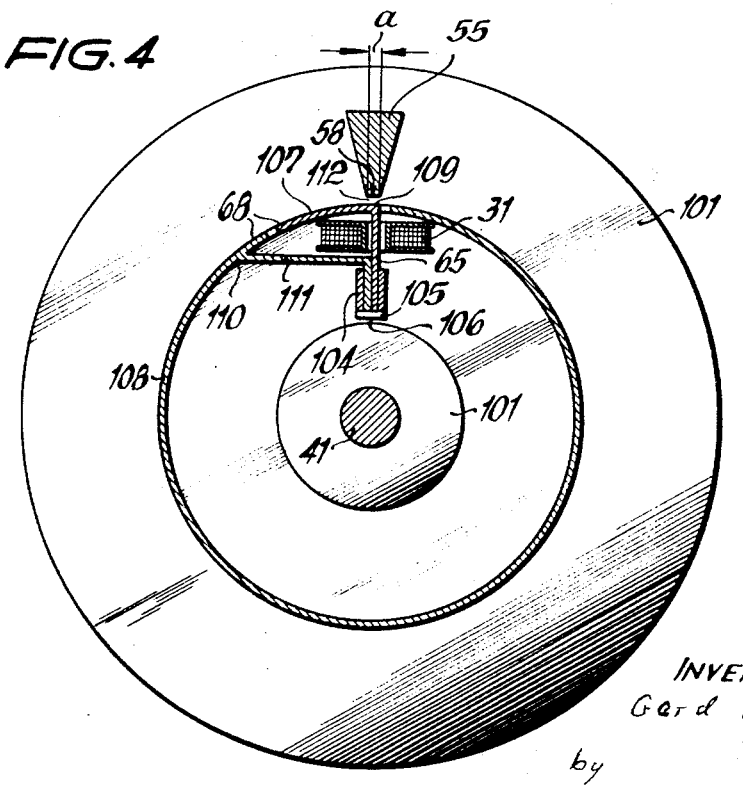
FIG. 4 is a cross-sectional end view of the control generator, in accordance with the present invention, taken along line IV—IV in FIG. 3.

The part 107 is magnetically linked with the soft iron core 65 at a location 109 (see FIG. 4). Accordingly, the part 107 may be constructed together with the core 65 out of a single piece of material. As shown in FIG. 4, furthermore, the part 108 is magnetically linked to a diverting member 111 which does not lead through the induction coil. The parts 108 and 111 can be secured to each other through welding or bolting at the location 110. The diverting link 111 is, similar to the soft iron core 65. secured to the member 104 by means of the screw 102 and 103. The member 104 is, on the other hand, secured to the permanent magnet 54.

Between the narrow frontal surface 58 of the rotary member 55, and the stationary pole piece 68, resides only a single narrow air space 112. In this manner the magnetic flux emanating from the member 55 is directed into the pole piece 68 in an essentially perpendicular manner.

When the crankshaft of the engine is set into motion, the member 55 passes the cylindrical-shaped pole piece 68 once for every revolution of the crankshaft. As long as the member 55 moves past the part 107, the magnetic flux from the permanent magnet 54, $\Phi_0$ is divided into two parts $\Phi_1$, and $\Phi_2$. The portion $\Phi_1$ is directed through the part 107 and acts upon the induction coil 31. The magnetic flux portion $\Phi_2$ is transmitted through the part 108 and passed by the induction coil through the diverting member 111.

The induced voltage $u$ resulting from the magnetic flux portion $\Phi_1$ in the induction coil 31 increases with increasing angle of rotation $\alpha$. When this induced voltage reaches a predetermined level $u_0$, the electronic switching arrangement 13 becomes actuated and produces an ignition pulse within the ignition coil connected to the output 10. This ignition pulse is then transmitted further to the spark plugs of the internal combustion engine. In relation to the instant of time when the dead center positions of the pistonhead are reached, this predetermined level $U_0$ is attained earlier with increase in the rotational speed of the crank shaft. In this manner, the ignition instant is advanced increasingly with increase in the rotational speed $n$.

Figure 6:
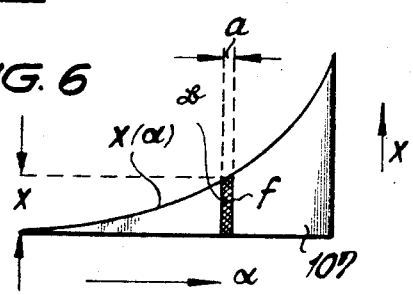
FIG. 6 is a development of the stationary member linked with the core of the induction coil, and shows the analytical relationships which govern the design of this member.

In what follows, it is shown that definite ignition angles $\varphi = 1 \ (n)$ prescribed as a function of the crank speed $n$ with respect to a dead center position can be achieved by the present ignition arrangement through the condition that the axial length $x$ of the part 107 coupled with the induction coil 31, varies with the angle $\varphi$ in accordance with the differential equation $$\frac{dx}{d\alpha} = -\frac{1}{n(\varphi)} \cdot C$$

wherein $\alpha$ is the angle of rotation of the rotary member 55, $n(\varphi)$ is the inverse function of the ignition position function $\varphi(n)$, and C is a constant. For the purpose of analysis, FIG 6 shows the part 107 together with the pertinent parameters associated with the design.

If a coil having a number of turns $w$ is subjected to a magnetic flux of density L which varies with time, the induced voltage is given by the relationship, $$u = -w \cdot \frac{d\Phi}{dt} \tag{1}$$

wherein the magnetic flux $\Phi$ is given by:

$$\Phi = \int_f L df \tag{2}$$

wherein $f$ is the surface enclosed by the coil. In the induction coil 31 of the present invention is, therefore, the portion $\Phi_1$ emanating from the member 55. When the member 55 is located at the position $\alpha$, $\Phi_1$ is:

$$\Phi_1 = Bax_\alpha \tag{3}$$

The induced voltage within the induction coil 31 is therefore:

$$u = -wBa \cdot \frac{dx(\alpha)}{dt} \tag{4}$$

Since $$\alpha = 2\pi n_{(t)} t \tag{5}$$

Equation 4 yields:

$$u = -wBa \cdot \frac{dx}{d\alpha} \cdot 2\pi n_{(t)} \left(1 + \frac{t}{n_{(t)}} \cdot \frac{dn}{dt}\right) \tag{6}$$

In the stationary case to which the following discussion is limited, the rotational speed $n_{(t)}$ can be considered substantially constant within the time interval during which the member 55 moves over the part 107. Accordingly, $$dn/dt = 0 \tag{7}$$

As a result, the second term within the bracket of Equation 6 is eliminated, and the induced voltage within the induction coil 31 is:

$$u = -2\pi wBa \cdot n \frac{dx}{d\alpha} \tag{8}$$

The voltage $u$ is therefore proportional to the rotational speed $n$ and also proportional to $dx/d\alpha$. If now the value $U_0$ is substituted for $u$ in Equation 8, the actuating condition for the ignition arrangement is obtained as:

$$\frac{dx}{d\alpha} = -\frac{1}{n} \cdot \frac{U_0}{2\pi awB} \tag{9}$$

Let $$\frac{U_0}{2\pi awB} = C \tag{10}$$

then $$\frac{dx}{d\alpha} = -\frac{1}{n} C \tag{11}$$

From this relationship a differential equation for $x\ (\alpha)$ may be realized through the elimination in favor of $\alpha$. This results with the aid of the ignition function $\varphi_{(n)}$ prescribed, whereby the latter is solved for $n$ and substituted into Equation 11, yielding:

$$\frac{dx}{d\alpha} = -\frac{1}{n_{(\varphi)}} C \tag{12}$$

With $\varphi = \alpha$, the solution of the differential equation provides the function $x_{(\alpha)}$ for the design of the part 107, in the desired manner. Since Equation 12 can be integrated for arbitrary function $n_{(\varphi)}$, and since the parts 107 and 108 can be constructed with arbitrary axial lengths $x_{(a)}$ as well as $l-x_{(a)}$, any desired ignition position $\varphi_{(n)}$ may be attained with the ignition arrangement of the present invention. For $$\varphi = -kn \qquad (13)$$

integration of Equation 12 for $x_{(a)}$ gives $$x = Ck \cdot \ln\alpha + D \qquad (14)$$

where D is an integration constant.

In one design of the present invention it was found that disturbing eddy-currents prevailed at higher rotational speeds when the magnetic parts of the control generator 30 were made of soft iron material. In particular, deviations between the above-described values and actual measured values of the ignition position function $\varphi_{(n)}$ were noted, at higher speeds. This disadvantage resulting from the eddy currents may be suppressed by constructing the magnetic parts 55, 65, 101, 104, 105, 107, 107 and 111 out of laminated sections. Parts 107 and 108 should, at the very least, be constructed of such laminations.

The present invention is not confined to the embodiment shown in the drawing. Depending on the number of cylinders present, the disk 101 may be made to carry a plurality of magnetically conducting members 55, equally spaced from each other. For example, in a four cylinder four-cycle engine two such members 55 may be positioned from each other by 180°. The pole piece 68 can be designed in the form of a segment rather than a cylindrical enclosure. This segment must, however, be so large that the part 107 is fully enclosed on both sides by the part 108. The pole piece 68 may also be of different shape, as for example, of spherical design.

The permanent magnet 54 may be replaced by an electromagnet. In place of the ignition coil connected to the output 10, a storage capacitor may be applied. The storage capacitor may function in conjunction with an ignition transformer. In the electronic switching arrangement 13, the switching stage and the power amplifying stage may be combined within a single circle.

It will be understood that each of the elements described above, or two or more together, may also find a useful application in other types of ignition arrangements for internal combustion engines differing from the types described above.

While the invention has been illustrated and described as embodied in an ignition arrangement for internal combustion engines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An ignition arrangement for internal combustion engines comprising, in combination, an induction coil; a stationary magnetizable core supporting said induction coil; a first stationary pole piece member magnetically linked with said core; a second stationary pole piece member magnetically isolated from said first pole piece member and from said induction coil, said first and second pole piece members forming a substantially cylindrical surface; a magnetizable movable member rotatable about the axis of said cylindrical surface and having a surface facing said cylindrical surface with length along said axis substantially greater than the width of said surface transverse to said axis; stationary magnetic means linking said movable member with said first stationary pole piece member for forming a magnetic circuit through said core and said induction coil; and magnetizable bridging member secured to said second stationary member and bypassing the magnetic circuit through said induction coil, said first and second pole piece members being shaped relative to each other so that a longitudinal element along said cylindrical surface has a subdivided length of a partial element on said first pole piece member and a partial element on said second pole piece member, the lengths of said partial elements varying relative to each other with the sum of the lengths of said partial elements being equal to the lengths of said magnetizable movable member, whereby the magnetic flux established by said magnetic means between said movable member and first stationary member induces a voltage of varying magnitude within said induction coil as said movable member moves in relation to said first stationary member.

2. The ignition arrangement as defined in claim 1, including rotational shaft means secured to said magnetizable movable member for rotating said movable member about said axis of said cylindrical surface and about said stationary pole piece members.

3. The ignition arrangement as defined in claim 1, wherein said first stationary pole piece member has a shape determined by the relationship $$\frac{dx}{d\alpha} = -\frac{1}{n(\varphi)} \cdot C$$

where $x$ is the length of said partial element on said first stationary member in the direction perpendicular to the relative motion of said movable member with respect to said stationary members; $\alpha$ is the angle of rotation of said movable member with respect to said stationary members for increasing values of the angle; $C$ is a constant; $n$ is the speed of the crankshaft of the internal combustion engine; and $n(\varphi)$ is the inverse function of the desired ignition position function $\varphi(n)$, the latter being the ignition angle relative to a dead center position of the crankshaft and being variable as a function of the speed thereof.

4. The ignition arrangement as defined in claim 1 wherein said core, stationary pole piece members and movable member are of laminated magnetizable material.

5. The ignition arrangement as defined in claim 1 including an electronic switching circuit actuated by the voltage induced in said induction coil and providing thereby an ignition pulse.

6. The ignition arrangement as defined in claim 1 wherein said movable member comprises a rotatable shaft; a magnetizable disk secured to said shaft and rotating therewith; and an elongated magnetizable member secured to said disk and moving past said stationary pole piece members.

7. The ignition arrangement as defined in claim 1 including magnet supporting means for supporting said magnetic means and securing the same to said stationary members.

8. The ignition arrangement as defined in claim 1 wherein said magnetic means is a permanent magnet.

9. The ignition arrangement as defined in claim 1 wherein said magnetic means is an electromagnet.

10. An ignition arrangement for internal combustion engines, comprising, in combination, an induction coil; a stationary magnetizable core supporting said induction coil; a first stationary pole piece member magnetically linked with said core; a second stationary pole piece member magnetically isolated from said first pole piece member and from said induction coil; a magnetizable movable member driven by said engine and movable with respect to said first and second members and having magnetic flux linked with said members shaped so that the magnetic flux patterns varies with the relative position of said movable member with respect to said first and second pole piece members; and magnetic means linking said movable member with said stationary pole piece members to form a magnetic circuit whereby the magnetic flux between said movable member and said first stationary member induces a voltage of varying magnitude within said induction coil as said mavable member moves in relation to said first stationary member, said flux between said movable member and said first stationary member varying so that said voltage reaches a predetermined magnitude at an instant varying with the speed of said movable member for varying the ignition timing advance of said engine as a function of the speed of said engine.

References Cited

UNITED STATES PATENTS

| | | | |
|---|---|---|---|
| 2,446,671 | 8/1948 | Short et al. | 123—149 |
| 3,139,876 | 7/1964 | Jukes | 123—148 |
| 3,356,896 | 12/1967 | Shano | 123—148 XR |

LAURENCE M. GOODRIDGE, Primary Examiner.

U.S. Cl. X.R.

315—209